UNITED STATES PATENT OFFICE

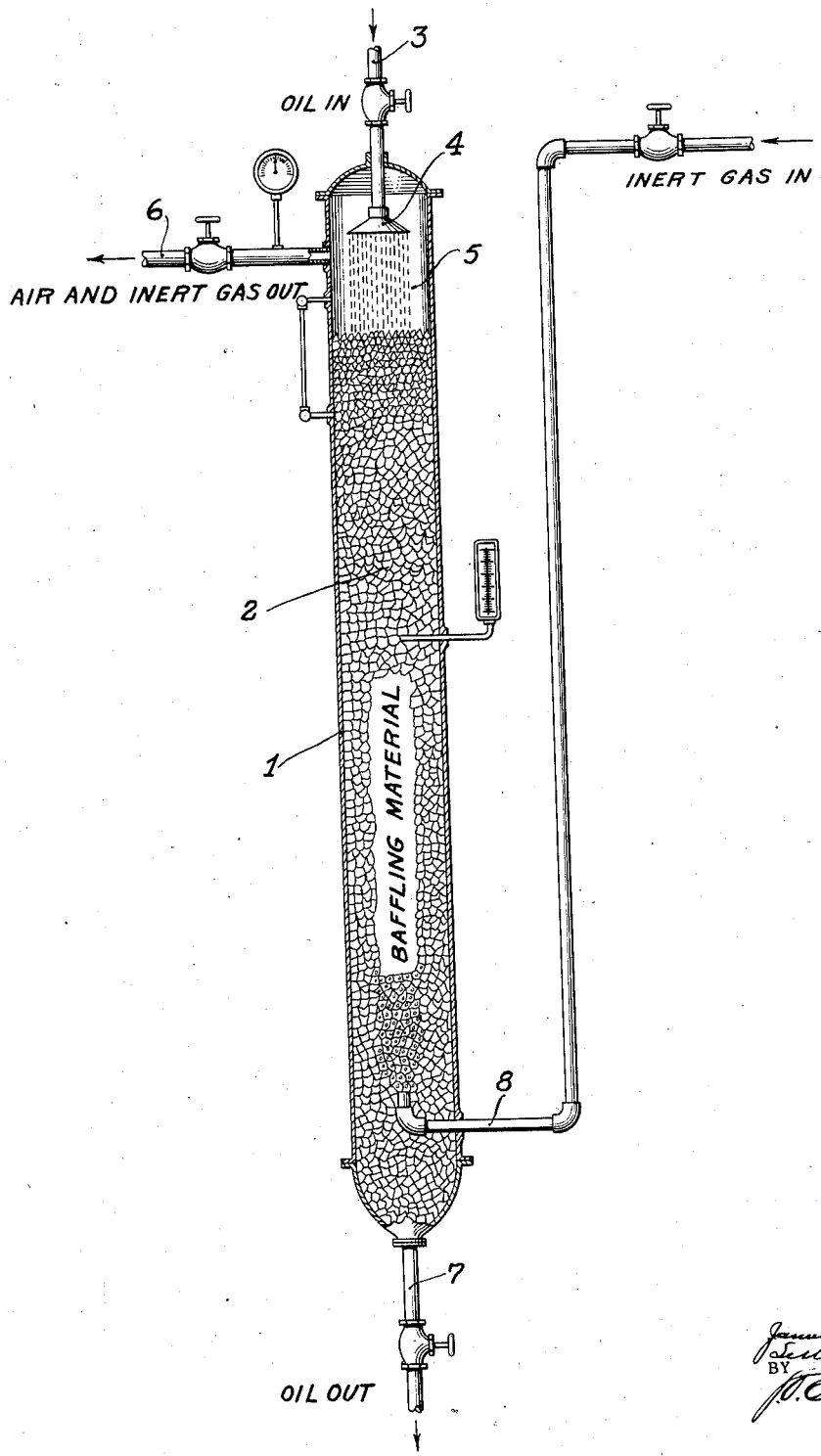

JAMES B. RATHER AND LESLIE C. BEARD, JR., OF BROOKLYN, NEW YORK, ASSIGNORS TO STANDARD OIL COMPANY OF NEW YORK, OF NEW YORK, N. Y., A CORPORATION OF NEW YORK

DISTILLATE PETROLEUM LIQUID

Application filed November 26, 1926. Serial No. 151,004.

This invention relates to distillate petroleum liquids, and more particularly relates to a method of storing and handling such liquids, especially those having A. P. I. gravity higher than 37°, such as kerosene and gasoline.

It is well known that when distillate petroleum products are stored and handled in the manner heretofore in vogue these products gradually undergo changes which are detrimental to their color and odor, and frequently gummy material forms therein which renders them unfit for the uses for which they are intended.

The principal object of this invention is to provide a method of storing and handling distillate petroleum liquids which prevents the products from undergoing these changes which cause discoloration, odor or the formation of deleterious substances. Other objects of this invention will be in part obvious and in part pointed out hereinafter.

Applicants have discovered that when a distillate petroleum liquid, while fresh from the still, is deprived of its air content and is thereafter kept from contact with air, the liquid will not become discolored or odorous, and no deleterious substances will form therein.

In the accompanying drawing, forming a part of this application, is shown, for the purpose of illustration only, one possible apparatus for removing air from a distillate petroleum liquid; the figure being a sectional view.

Referring to the drawing, 1 indicates a vertical container or tube containing suitable baffling means, for instance, loose fragments 2 of material which does not react with the distillate. A liquid inlet pipe 3 at the top of the tube carries a spray nozzle 4 located in a space 5 above the baffling material. A gas discharge pipe 6 leads from the tube near the top. A liquid discharge pipe 7 leads from the bottom of the tube, and somewhat above this a gas inlet pipe 8 leads into the tube. The liquid from which it is desired to remove the air, free or dissolved, is sprayed upon the baffling material and trickles downwardly in the tube, meeting an upwardly flowing counter current of a suitable inert gas which passes into the container through pipe 8. This inert gas sweeps the air from the liquid and with the taken-up air exits through pipe 6. The liquid is thus substantially deprived of its air content by the time the liquid reaches the bottom of the container, where it passes out through pipe 7 and is conducted to and charged into any suitable receptacle or receptacles, such as a tank, drum, bottles or the like (not shown), in which the liquid is to be stored or handled. It is recommended that the oil in the tube be maintained at a temperature of from 125 to 150° F. The higher the temperature employed, during the contacting of the oil and the inert gas, the lower will be the solubility of both the air and the inert gas in the oil and the faster the rates of diffusion of the gases in the oil. It is obvious from this, that the higher the temperature employed, the faster and more complete will be the removal of the air from the oil by a given quantity of inert gas. It is understood, of course, that the temperature employed must not be sufficiently high, however, to accomplish any appreciable chemical combination of oxygen with the oil during the removal of the air. Such chemical combination of the oxygen will be evidenced by a discoloration of the oil. The mixture of inert gas and air which leaves the apparatus through pipe 6 can be used for freeing oil saturated with air of some of its dissolved air. It is obvious, of course, that by separating the inert gas and the air at this point by either chemical or physical means the inert gas can be used again.

The liquid is not allowed to contact with air during any part of the charging, storing or handling, and to this end the receptacles into which the liquid passes after being deprived of its air content are previously filled with inert gas, and after being charged the receptacles are hermetically sealed to prevent escape of the inert gas and to prevent the entrance of air into contact with the liquid.

If desired, the removal of the air content from the liquid may be accomplished by an alternative method, comprising the alternate saturation and evacuation of the liquid with an inert gas. Other well known methods may also be employed for the purpose, if desired or preferred.

For the inert gas applicants suggest the use of carbon dioxide or nitrogen, although other suitable inert gases are available for the purpose.

From the above it will be apparent that the method comprehends the maintenance of the kerosene or gasoline out of contact with air, free or dissolved, preferably from shortly after the time the distillate is received from the still to about the time it is to be used. By handling kerosene and gasoline under such conditions, and in this manner, the product will remain for an extended length of time without becoming discolored, odorous, and without gummy substance forming therein.

As many changes could be made in the above method, and as many widely different embodiments of this invention could be made without departing from the scope thereof, it is intended that all matter contained in the above description shall be interpreted as illustrative and not in a limiting sense.

What we claim is:—

1. The method of color stabilizing refined petroleum distillates, having A. P. I. gravity higher than 37 degrees which includes passing a finely divided stream of liquid petroleum distillate down through a container filled with baffle pieces, forcing a stream of inert gas up through said baffle pieces and into intimate contact with said finely divided stream of petroleum distillate to cause said inert gas to remove the air content from the distillate, and then removing the distillate from further contact with the inert gas and removed air.

2. The method of treating petroleum distillates having A. P. I. gravity higher than 37 degrees to prevent discoloration and the formation of odor and gummy substances, which includes passing a finely divided stream of the petroleum distillate down through a container filled with baffle pieces, forcing a stream of inert gas up through said baffle pieces and into intimate contact with said finely divided stream of petroleum distillate to cause said inert gas to remove the air content from the distillate, drawing off the purified distillate from the bottom of the container, drawing off the air and inert gas from the top of the container.

3. The method of preserving gasoline and kerosene against formation of color, odor and gum, which includes passing a copious flow of inert gas counter current through a finely divided stream of the gasoline or kerosene to cause the inert gas to take up the air contained in the gasoline or kerosene, and removing the gasoline or kerosene from further contact with the inert gas and taken-up air.

4. The method of preserving gasoline and kerosene against formation of color, odor and gum, which includes passing a copious flow of inert gas through a finely divided stream of the gasoline or kerosene percolating through baffling material to cause the inert gas to take up the air contained in the gasoline or kerosene, and removing the gasoline or kerosene from further contact with the inert gas and taken-up air.

5. The method of preserving gasoline and kerosene against formation of color, odor and gum, which includes passing a copious flow of inert gas upwardly through a finely divided stream of gasoline or kerosene percolating downwardly through loose fragments of baffling material to cause the inert gas to take up the air carried by the gasoline or kerosene, and removing the gasoline or kerosene from further contact with the inert gas and taken-up air.

This specification signed this 23 day of November, 1926.

JAMES B. RATHER.
LESLIE C. BEARD, Jr.